UNITED STATES PATENT OFFICE.

MINAS D. GIFFIN, ARTHUR G. LINGLEY, TERENCE CASSIDY, AND JAMES CASSIDY, OF BUTTE, MONTANA.

MINERAL PAINT.

984,477.

Specification of Letters Patent.  Patented Feb. 14, 1911.

No Drawing.  Application filed May 29, 1909.  Serial No. 499,185.

*To all whom it may concern:*

Be it known that we, MINAS D. GIFFIN, ARTHUR G. LINGLEY, TERENCE CASSIDY, and JAMES CASSIDY, citizens of the United States, residing at Butte, in the county of Silverbow and State of Montana, have invented certain new and useful Improvements in Mineral Paints, of which the following is a specification.

This invention relates generally to mineral paints, and more particularly refers to a paint to be used on iron and steel work installed in mines, tunnels, rivers and all other places where these metals are subjected to the constant action of rust caused by the presence of acids, acidulous waters, alkalis and by the deleterious effects of various atmospheric conditions.

It is the object of the present invention to produce a paint of the character above set forth, and further, to produce a paint which may be manufactured into solid blocks for shipment or storage, but is ready for instant use upon being melted by ordinary heat, and may be applied with a brush. Also, it is an object of this invention to produce a paint which dries to a perfectly smooth, glazed surface, naturally a jet black, without traces of brush-streaks or marring spots, thus permitting its use in places where the most presentable work is desired.

In the manufacture of this product, use has been made of the asphaltic minerals, elaterite and gilsonite, which, when combined by the process hereinafter set forth, have been found to form the basis of a coating which absolutely resists the actions of water, acids and alkalis.

As a first step in the process, a quantity of elaterite, which is known to be insoluble in acids and alkalies, is pulverized, and boiled, under suitable circumstances, with boiled oil in sufficient quantity to dissolve the elaterite and produce an intimate admixture of the two. When the boiling point is nearly reached, a quantity of resin is added to the mixture. The addition of resin at this point has been found to impart an elasticity to the product unusual in paints, and highly advantageous. Then, a portion of gilsonite, in equal quantity as the elaterite, is pulverized and boiled with turpentine. Gilsonite is well-known for its non-conducting properties as well as its resistance to the action of acids and alkalis, and when combined in suitable quantities with elaterite, prepared as above set forth, forms an unexcelled base for the paint which is the subject of this invention. We have found that the gilsonite used as one as a base is equally effective as when combined with elaterite, the wearing properties of the product being practically the same for the single base composition as for the double base preparation. We, therefore, do not confine this invention to the limits of the formula using both gilsonite and elaterite, but hold the use of both or either of the asphaltic minerals to be well within the scope of the invention.

Sufficient turpentine is boiled with the gilsonite to form a comparatively thin mixture. The elaterite dissolved in boiled oil, is then added to the gilsonite and turpentine, the latter mixture being of such thin consistency that the whole admixture can be properly worked without the addition of further liquid thinners. It is necessary that the two minerals be separately boiled and dissolved, owing to their different properties and the different times required to properly treat them.

After the minerals have been poured into the same container or vessel, a quantity of sulfur is added thereto and allowed to be boiled with the mixture. The sulfur acts to fuse the two asphaltic minerals and cause a perfect combination thereof. The mixture is kept hot beyond the point of fusion, to allow the sulfur to be completely combined or dissolved in the asphaltum, as with the fusion of the parts, its purpose is accomplished, and its further presence in the composition is unnecessary. This last named step, namely the fusion and combined boiling process, has produced a chemical change in the mineral products which is not entirely clear to us, but which results in a paint having positively the qualities claimed above for the compound, as well as other peculiarities and characteristics not essential to enumerate. To the fused mixture tallow and ozokerite are now added, the former to prevent the mass from sticking in composition, and the latter to act as a mineral hardening medium. The mass is then allowed to cool, and prepared for commercial use and the market in any suitable package, but we have found it desirable to mold the cooling mass into briquets or blocks; the composition being well adapted to assume and retain this formation, and is easily reduced to working condition by being melted over an ordinary heat. The paint is easily applied with a brush and dries or hardens with a perfectly smooth, glazed surface, and is jet black in color.

This paint can be made in the open air without being affected by atmospheric conditions, and it is evident that it is well adapted to be manufactured on a commercial basis.

What we claim and desire to secure by Letters Patent of the United States is:

1. A process of making paint, which consists in dissolving elaterite with boiled oil and gilsonite with turpentine, and combining the minerals by mixing and boiling with sulfur.

2. The process of making paint which consists in boiling a quantity of gilsonite and turpentine, dissolving an equal quantity of elaterite in boiled oil, adding the two quantities, adding a quantity of sulfur and combining the mixture by boiling until the sulfur is combined, and then adding tallow and ozokerite.

In testimony whereof we affix our signatures in presence of two witnesses.

MINAS D. GIFFIN.
ARTHUR G. LINGLEY.
TERENCE CASSIDY.
JAMES CASSIDY.

Witnesses:
W. E. WARD,
JESSIE COCHRAN.